(No Model.)
A. BERGHAUSEN.
FIRE DAMP ANNUNCIATOR.
No. 370,851. Patented Oct. 4, 1887.
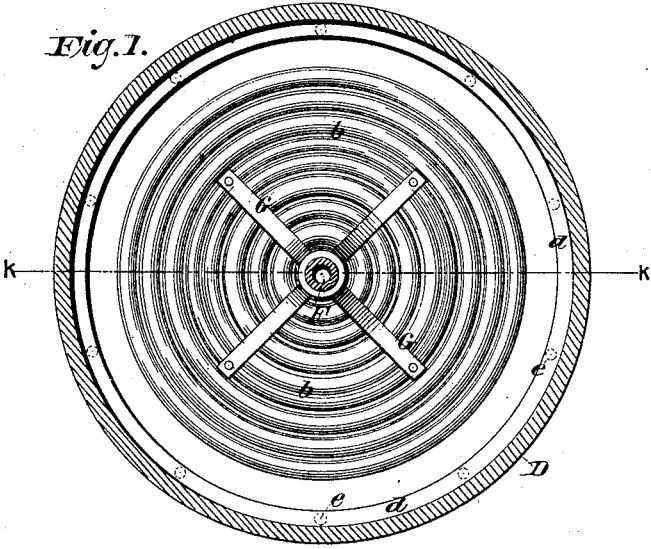
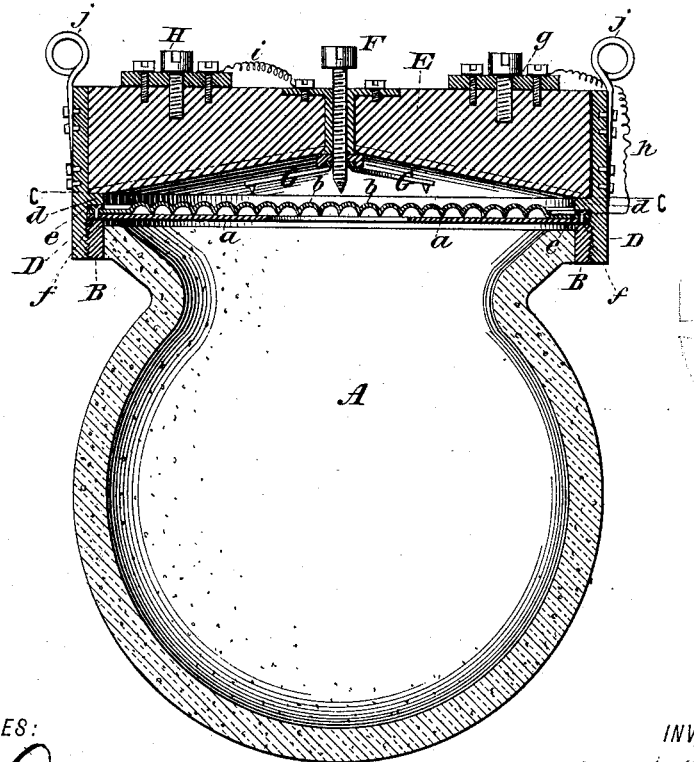
WITNESSES:
INVENTOR
ATTORNEYS

UNITED STATES PATENT OFFICE.

AUGUST BERGHAUSEN, OF ELBERFELD, GERMANY.

FIRE-DAMP ANNUNCIATOR.

SPECIFICATION forming part of Letters Patent No. 370,851, dated October 4, 1887.

Application filed April 2, 1887. Serial No. 233,365. (No model.)

*To all whom it may concern:*

Be it known that I, AUGUST BERGHAUSEN, of Elberfeld, Germany, have invented a new and Improved Fire-Damp Annunciator for Mines, &c., of which the following is a full, clear, and exact description.

The object of my invention is to provide an improved apparatus for automatically announcing the presence of fire-damp in mines, &c.

The invention consists in the combination, with a porous vessel carrying a removable shell at one end, of a membrane within said shell and adapted to be operated by the gases in the vessel, a cover over the membrane, and electrical contacts and connections with said membrane and vessel, as will be more fully hereinafter set forth.

Reference is to be had to the accompanying drawings, forming part of this specification, in which—

Figure 1 is a horizontal section of my improved apparatus, taken on line $c\ c$, Fig. 2; and Fig. 2 is a vertical section of the same, taken on line $k\ k$, Fig. 1.

It is a well-known fact that gases—such, for instance, as that termed "fire-damp"—which are lighter than atmospheric air seek to intermingle with the air when separated therefrom by a porous wall. It is also an established fact that lighter gases pass through such porous walls much more rapidly than air or dense gases. My invention seeks to utilize these facts by making the porous wall in the form of a vessel which normally contains atmospheric air, but which, when approached by a lighter gas—such as fire-damp—becomes filled with a mixture of that gas with air. The gas being the least dense, enters the porous cup more rapidly than the air leaves the same, and for a time, therefore, pressure is generated within the cup which I utilize for moving a membrane and establishing an electric circuit to sound an alarm. I accomplish this by the following improved apparatus:

A in the drawings represents a porous vessel of suitable form and size, open at one end. The vessel A at its upper part has hermetically secured to it the brass ring B, which is provided on its outer edge with screw-threads, as shown.

D is a shell of copper or brass, which is screwed on the ring B, as shown, and is provided with the inner flange, $d$.

$a$ is an open frame or perforated plate, which at its edges rests upon the ring B and is under the flange $d$.

$b$ is a metal membrane of undulating or other construction, and which preferably rests upon the frame $a$. This membrane closes the open side of the cup A.

$e$ is a metal ring which rests upon membrane $b$ at its edges.

$f$ are screws which pass through the parts $a$, $b$, and $e$ and hold them securely together, the flange $d$ serving to hold them all in place on ring B.

E is the cover of shell D, and is preferably hollowed out on its under side and rests upon the flange $d$, as shown. The cover E is made of stone, porcelain, or any other non-conductor.

F is a contact-screw, which passes through cover E and through the contact-jaws G, and its lower end is arranged near to, but does not normally touch, the membrane $b$. The contact-jaws G are carried by the cover E, and their points are preferably arranged on a plane with the end of screw F, and so adjusted that they may be moved with and by said screw F. The membrane $b$ is in electrical connection with the post $g$ by means of the conductor $h$, and said post $g$ is in connection with a suitable battery or other generator of electricity. The contact-screw F and jaws G are in electrical connection with the post H by means of conductor $i$. The post H is in electrical connection with the same battery, and a suitably-arranged bell or annunciator is placed in the circuit at the desired station.

$j$ are hooks by which the detector may be suspended.

This apparatus operates as follows: The detector is to be suspended in a mine near the roof. If a gas lighter than air—such as fire-damp—is generated in the mine, it instantly enters the porous cup A, the air leaving said cup at the same time; but as the gas enters faster than the air leaves the cup pressure is for a time generated within the cup. This pressure acts against the membrane $b$ and causes same to rise against the screw F or jaws G, thereby closing the circuit and causing the bell at the end of the line to be sounded, thus automatically notifying the attendant of the presence of fire-damp in the mine.

The invention can also be used as a fire-alarm, the lighter heated air producing pressure in the cup while displacing the normal denser cool air in said cup.

Having now described my invention, what I claim is—

The porous vessel A, provided with fixed ring B, shell D, removably secured on ring B, and cover E, carried by shell D, in combination with the membrane $b$, held by the shell D, and contacts F and G, the membrane $b$ and contacts F and G being electrically connected with a battery and alarm instrument, as set forth.

The above specification of my invention signed by me.

A. BERGHAUSEN.

Witnesses:
EMIL DORNGT.
HERMAN JUNKER.